United States Patent [19]

Gregor

[11] B 4,012,324
[45] Mar. 15, 1977

[54] CROSSLINKED, INTERPOLYMER FIXED-CHARGE MEMBRANES

[75] Inventor: Harry P. Gregor, Leonia, N.J.

[73] Assignee: Harry P. Gregor, Leonia, N.J.

[22] Filed: Jan. 15, 1974

[21] Appl. No.: 433,930

[44] Published under the second Trial Voluntary Protest Program on March 23, 1976 as document No. B 433,930.

Related U.S. Application Data

[62] Division of Ser. No. 166,606, July 27, 1971, Pat. No. 3,808,305.

[52] U.S. Cl. .................... 210/500 M; 210/23 F; 210/23 H
[51] Int. Cl.² .................... B01D 31/00; B01D 13/00
[58] Field of Search ............ 210/22, 23, 321, 490, 210/500 M; 204/180 P; 260/2.1 E

[56] References Cited

UNITED STATES PATENTS

| 3,004,904 | 10/1961 | Gregor et al. | 204/180 P |
|---|---|---|---|
| 3,132,094 | 5/1964 | McKelvey, Jr. | 210/23 |
| 3,297,545 | 1/1967 | Mindick et al. | 204/180 P |
| 3,451,951 | 6/1969 | Mizutani et al. | 260/2.1 E |
| 3,647,086 | 3/1972 | Mizutani et al. | 210/500 |
| 3,737,045 | 6/1973 | Hashimoto et al. | 210/490 |

Primary Examiner—Frank A. Spear, Jr.
Attorney, Agent, or Firm—Burgess, Dinklage & Sprung

[57] ABSTRACT

Interpolymer fixed-charge membranes of macroscopic homogeneity are prepared by providing a solution containing a matrix polymer, a polyelectrolyte and a crosslinking agent, evaporating the solvent until substantially the desired pore size and other physical properties are obtained in a film cast from the solution, the thereafter chemically crosslinking the film to insolubilize the membrane.

3 Claims, No Drawings

CROSSLINKED, INTERPOLYMER FIXED-CHARGE MEMBRANES

This is a division of application Ser. No. 166,606, filed July 27, 1971, now U.S. Pat. No. 3,808,305.

BACKGROUND OF THE INVENTION

The present invention is directed to the preparation of a class of fixed-charge membranes that (by employing modifications of composition and procedure) are applicable as ion-exchange membranes for electrodialysis, as bipolar membranes for water-splitting processes, as selective membranes for dialysis processes and, more particularly, as ultrafiltration membranes in pressure-driven processes.

The conventional solvent-type reverse osmosis membranes require a substantial hydrostatic pressure be applied to the solution to be purified on the side of the membranes that contains the solvent or the desired component through the membrane leaving the undesirable component or solute behind because the membrane is relatively impermeable to the undesirable solute. Reverse osmosis processes have the disadvantage in that they require very high pressures, for example, pressures of about 600 to 1000 psi above the reversible osmotic pressures are commonly employed. These high pressures present certain practical difficulties that must be overcome. Additionally, reverse osmosis membranes have comparatively limited applications because they are relatively nonselective and customarily permeable only to the solvent, e.g., water. Accordingly, reverse osmosis membranes are not ordinarily especially useful in separating the dissolved components of a solution as is often required in the treatment of mixtures. Further, when used to treat solutions containing high molecular weight material such as proteins or dissolved organic matter, they tend to get clogged or readily poisoned as the organic matter is selectively absorbed by the membrane. Organic matter can either coat the surface or make it hydrophobic and thereby prevent the transport of water across it. Specifically, as in desalination and other water renovation processes, the organic matter can penetrate the membrane, disrupt the hydrogen-bonded water structure, which is apparently responsible for the selective action of the membranes, and thereby destroy either the selective action of the membrane or its high flux rate, or both.

The conventional ion-exchange membranes employed in electrodialysis are known to possess useful electrochemical properties. However, ion-exchange membranes have the drawback of being relatively expensive because they are customarily produced by time-consuming and conventional chemical reactions. Therefore, it is the practice to use rather high current densities to keep investment costs to a minimum, and for this reason the power consumption of electrodialysis devices is very substantial. Also, with electrodialysis, as carried out at high current densities, many undesirable side effects are known to occur; for example, in sea water desalting, electrodialysis devices frequently use a high current density with the result that the power consumed is 150 kilowatt hours per 1,000 gallons desalted in contrast to the theoretical power requirement of approximately 3 kwh. Further, conventional ion-exchange membranes possess a low hydraulic permeability so they cannot be used for pressure-driven processes as those of reverse osmosis or ultrafiltration. Additionally, ion-exchange membranes usually cannot be sealed together to form bipolar or multipolar membranes, and their low hydraulic permeability precludes their being used in bipolar water-splitting processes which use electric currents high enough to be practical.

Ultrafiltration membranes capable of separating dissolved solved solutes of molecular weights ranging from those of the common salts to proteins have been made in the past by mixtures of polyelectrolytes held together by purely ionic bonds as complexes of polyacids and polybases, deposited upon a hydrophobic, porous matrix, or they are porous films of largely hydrophobic polymers usually formed by coagulation techniques. The polysalt complexes are not chemically (covalently) crosslinked, and they always contain a mixture of fixed positive and negative charges. As such, they can interact with dissolved species, which are both anionic and cationic, and become fouled thereby. The hydrophobic membranes of this class also adsorb fouling agents of hydrophobic character and similarly become fouled, and their utility is inhibited thereby.

The purpose of the membranes of the present invention is directed to a novel method for preparing membranes and to the membranes produced thereby and which are useful for a variety of applications. For example, when used as ultrafiltration membranes, they can be used to separate dissolved materials using a variant of the more familiar reverse osmosis process, except, instead of requiring very high pressures, a high flux rate can be effected by the imposition of a moderate hydrostatic pressure, e.g., of the order of 25 to 150 psi. When employed as bipolar membranes they may be used for the production of acid and base by electrodialytic water-splitting. They may also be used effectively as ion-exchange membranes of low cost. Additionally, they are useful in separations involving passive diffusion of materials across the membrane by virtue of concentration gradients in passive dialysis.

As contrasted with cast membranes of ionic character, as described in the prior art, the novel membranes of the invention are chemically crosslinked by covalent bonds to the degree heretofore not attainable, so they retain their particularly desirable properties for prolonged periods of time, such crosslinking having been achieved from a membrane cast from a solution whose homogeneity was maintained over a wide range of compositions.

SUMMARY OF THE INVENTION

In accordance with the present invention, I have found that substantially improved fixed-charge membranes of excellent strength and controllable pore size may be prepared by casting a solution which includes a matrix polymer, a polyelectrolyte and a crosslinking agent to form a film that, when dried to an extent sufficient to remove solvent until the desired pore size is attained and then crosslinked, has essentially a fixed pore size. A layered membrane may also be formed by drying and partially, or wholly, curing a first layer in the foregoing manner and thereafter casting a superimposed layer, or layers, in sequence and drying and crosslinking the entire composite. The superimposed layers may comprise a membrane of the same or opposite charge or ultimately a neutral, i.e., a nonionic, membrane layer may be disposed between the sandwiching layers of the same or oppositely charged membranes, i.e., between an anionic and a cationic membrane.

DETAILED DESCRIPTION OF THE INVENTION

The present invention is directed to a novel method and to the products produced thereby for the preparation of thin, yet durable, and highly selectively permeable ionic or fixed-charge membranes which are characterized by their macroscopic homogeneity and high flux, i.e., they are highly permeable to water, but, because of their high degree of selectivity, they have a good and variable degree of rejection of solutes of different molecular weights. The process of the invention may use a variety of formulations, it being necessary only that the matrix polymer of the polyelectrolyte and the crosslinking agent be entirely soluble in a common solution prior to a casting of the film that is to comprise the membrane.

In principle, the process of the invention involves the dissolution of a matrix polymer which, upon crosslinking, forms an insoluble film together with a polyelectrolyte which supplies the high concentration of fixed-charge groups, i.e., ionic groups chemically bonded to the polymer. An essential aspect of the invention resides in the presence in the formulations of this invention of crosslinking agents, substances that react chemically to prevent dissolution or swelling of the membrane when in use in solvents such as water. Insolubilization may be attained by the addition to the matrix polymer and the polyelectrolyte of a crosslinking agent which has a moderate molecular weight and which itself is entwined with the two polymers, particularly the polyelectrolyte, insolubilizing it to produce a cage polymer with the polyelectrolyte within the crosslinked cage. Or, the crosslinking groups can be a part of either the matrix polymer or the polyelectrolyte reacting with one another on the same chain. Further, in some formulations a chemical crosslinking reaction can take place between the crosslinking agent and either the matrix polymer or the polyelectrolyte. In this manner, a highly flexible film is obtained with the crosslinking at the site of the polar polymer groups. These films have a high selectivity because the polyelectrolyte gel cannot swell excessively in aqueous solution and thereby the membrane maintains its stability.

When the mechanism by which the component elements of matrix polymer, polyelectrolyte and crosslinking agent are cast as a single solution permits the formation of relatively thin membranes, while affording excellent macroscopic homogeneity in the membrane combined with the property of extreme thinness, materials of a high solvent permeability and a high degree of salt and/or other solute rejection are obtainable. Further, the technique of preparing these membranes is such that they may be cast on either belts or other kinds of continuous equipment to form an unsupported film or they may be cast onto a supporting matrix such as a porous polymer film or a supporting film of cellulose derivative in the form of a porous film.

Membranes having fixed negative charges and fixed positive charges can be prepared by similar or the same techniques so that cation-permeable membranes and anion-permeable membranes may be prepared thereby.

The nature of the casting procedures, wherein a single solution is used containing all of the requisite components of the films, is such that membranes which are extremely thin but still coherent and of reasonable mechanical strength can be prepared without difficulty, while membranes as thin as 1 micron have readily been cast upon supporting surfaces.

An advantage of the polyionic films described herein is that they can be cast one on top of the other so that a multiple effect with alternating cation- and anion-permeable membrane regions is achieved. The effect achieved here is similar to that which is achieved in a mixed bed demineralizer in that the first layer, if it is cation permeable (and also nonfouling), rejects anions and the second anion-permeable layer rejects cations, and under the conditions of forced flow of the solvent through this system by virtue of the applied hydraulic pressure, a greater extent of demineralization than that obtained with a monoionic film of the same dimensions is achieved. Because the fixed-charge groups are cast separately, i.e., in different layers, and immobilized, they do not neutralize one another except at the boundary, and as a consequence retain their Donnan potential, i.e., the electric potential which is the basis of their semi-permeability to salt solutions.

Since films can be cast in a thickness of 1 micron or even lower, it is possible to cast these multi-ionic membranes in several alternating layers and still achieve a high hydraulic permeability for the system while maintaining a very high ionic rejection. Both types of ionic membranes can be prepared from the same matrix polymer, so they form a bond between layers which is essential inseparable.

Ionic membranes described above have many properties that make them superior. First, they are nonpoisoning to and unchanged by organic matter because of the nature of the polymer itself. Second, it is well known that the fouling effects observed with anion-exchange membranes are not observed with cation-exchange membranes, and in waters which are of a fouling nature the uppermost membrane can be a cation-exchange membrane, if the polyionic membranes are to be employed.

Another considerable advantage to these systems is that the casting procedure is simple and inexpensive because a thin film or layer is laid down and then allowed to dry. The thickness of the active layer is controlled simply by the amount of polymer applied, and also by its concentration in the solvent.

The porosity of these ionic membranes can be controlled in a number of ways. One of these is to employ polyelectrolytes and film-forming matrix polymers which are reasonably uniform in cross-sectional diameter, i.e., they do not have large rings or other substituents in side groups, thus making them capable of coming closer together in the final film and thereby making the pores in the film smaller. For example, for a very fine pore anion-permeable structure, one would employ as the ionic polymer a polymer of quaternized or partiallly quaternized polyethyleneimine together with a film-forming polymer such as polyvinyl chloride-acrylonitrile copolymer (e.g., Dynel available from Union Carbide Corporation) or polyvinylidine fluoride (e.g., Kynar available from Pennsalt Chemical Corporation) employing an epoxide as crosslinking agent. Similarly a very tight cation-permeable structure can be achieved by the employment of vinyl sulfonic acid together with similar film-forming matrix polymers. In systems of this kind, also, avoidance of the bulky benzene ring is achieved and there is less tendency to fouling in such membranes because of the absence of the aromatic structure.

The ultrafiltration method can be employed both with ionic membranes to separate out ionic from nonionic substances and with highly porous ionic membranes which have a low ionic filtering capacity but which, because of the unique properties of these films, are capable of filtering out lower from high molecular weight substances. For example, in the filtration of blood it is important to retard only the blood proteins and the materials of higher molecular weight and size. Under these circumstances, a film containing a high fraction of polyelectrolytes—one which is porous and therefore does not retard ions too strongly—would represent a most useful material.

Membranes particularly impermeable to acidic or basic solutions may be made by the employment of either a weak base or weak acid anion-exchange and cation-exchange materials. For example, in the hyperfiltration of sulfuric acid solutions the high acidity makes for the complete or nearly complete ionization of weakly basic groups. Here one prepares a membrane not from a quaternary ammonium polymer but rather from a linear or crosslinked weak base polymer such as polyethyleneimine, polyvinylimidazole or other kinds of weakly basic polymers. In acid streams one finds that these anion-exchange polymers are largely ionized and therefore act as excellent anion-permeable membranes. Further, by the employment of a weakly acidic polymer such as polyacrylic acid or similar materials, one can prepare polymers that have a small side group and also polymers that are relatively nonadsorbing to act as a cation-permeable membrane in high alkaline solutions. These latter solutions may occur in the treatment of alkaline wastes, in the treatment of caustic spinning solutions, and the like. Further, the use of these weakly acidic and weakly basic groups allows one to make materials of a particularly high charge density, and the nature of the groups themselves allows for the crosslinking reaction to take place directly with some of the ionogenic groups. Further, a higher extent of ionic selectivity generally can be achieved under these conditions than with strong acid and strong base ionic membranes.

One useful means of preparing films of well-controlled porosity, particularly at very low porosities, is to employ a condensation mixture in which the condensation has been carried only to the point of the linear material and not to the point of insolubilization and crosslinking. For example, one can partially condense a mixture of the sodium salt of p- or m-phenolsulfonic acid in an amount varying from 0.1 to 0.2 mol, a mol of phenol and 2-3 mols of formaldehyde in an aqueous medium using a base catalyst. This resole-type material can be combined with a flexible matrix polymer in a suitable solvent and then cast, dried and cured at a suitable temperature, e.g., at 150°C, to form thin films which are cation permeable, but only to small cations such as hydrogen, sodium and potassium and not to calcium or magnesium. It will be apparent that the existence of such membranes will be of considerable value in the chemical industry allowing for separation of soluble salts of different (hydrated) size.

As matrix polymers employed in forming the membranes using the process of the invention, any of a wide variety of polymers which are compatible with and are capable of dissolution in the same solvent with, or may form a common solution with, the polyelectrolyte and crosslinking agent may be used. It is not necessary that each of the matrix polymer, the polyelectrolyte and the crosslinking agent be soluble in the same solvent. For example, it is sufficient if each of these components being soluble in different solvents the solutions thereof are then miscible to form a common solution.

Suitable matrix polymers include, for example, polymers and copolymers of the type which are readily available and which may be dissolved and suitably cast on a substrate to be thereafter separated, and may be self-sustaining or retained as a composite with the substrate. Illustrative of such polymeric matrix materials are polyacrylonitrile, polyacrylic and polymethacrylic acids and polymerized esters of acrylic and methacrylic acid, polyvinylchloride, polyvinylfluoride, polyvinylidine chloride, polyvinylidine fluoride, polyvinyl butyral, polystyrene, polyarylmethyl styrene, polycarbonate, polymethyl methacrylate, polyolefins, polyamides, e.g., nylon 6 and nylon 66, polyesters, polyethyleneterephthalate, polyarylsulfones, polyphenylenesulfides, polyphenylethers, and the like.

Among the various polyelectrolytes that may be employed, I have found that sulfonic acid polyelectrolytes such as polystyrene sulfonic acid (PSSA), the sodium salt of polystyrene sulfonic acid (PSSNa), sulfonated polymethyl styrene, and copolymers thereof with other vinyl monomers, and polyvinyl sulfonic acid produce especially good results. Other polyelectrolytes that may be employed include, for example, sulfonated polyvinyl naphthalenes, sulfonated polyvinyl anthracenes, sulfonated linear phenol formaldehyde resins, condensation polyamides and polyesters containing comonomers such as sulfoisophthalic acid salts.

The sulfonic acid membranes prepared according to the teachings of this invention have a most advantageous additional attribute in that they are nonfouling. Membrane fouling is one of the critical problem areas in membrane technology. Many classes of dissolved or suspended species become adsorbed or dissolve in membranes lowering their permeability, reducing their selectivity, and interfering with their functionality. This is true of most of the known membrane systems and applies particularly to films having fixed positive charges (whether alone or combined with fixed negative charges) and to the relatively uncharged membranes.

I have found that the sulfonic acid membranes of this invention with their high polarity and water content and the consequent ability to repel anionic solutes (particularly the high molecular-weight anionic solutes that are most responsible for fouling), and ability to reject organic solutes because of their polar nature, not only do not become fouled in use but also are most valuable as a means for the pretreatment of waste or process streams prior to other treatment processes.

As described hereinafter, this class of membranes may be utilized as ultrafilters for pulp and paper-mill wastes and in the treatment of whey. In both instances the membranes are unchanged in their functional properties, even after days of use. These two kinds of solutions are known to be of a highly fouling nature.

As an example of the use of these membranes as pretreatment ultrafilters, they can be used in the pre-ultrafiltration of sugar refinery streams where they remove material whih can subsequently interfere with other treatment processes (such as electrodialysis) or in the sugar recovery process itself. Anion-exchange membranes and resins are quickly fouled by certain constituents of sugar refinery process streams. After pretreatment of these streams with the sulfonic acid membranes of the invention, these other processes become possible.

One of the most important and, indeed, essential distinguishing features of the membranes of the invention involves the use of crosslinking agents or reactions in significant amounts. Interpolymer membranes held together solely by a mechanical intertwining of dissimilar polymers or by van der Waals' bonds are insolubilized only for relatively short periods of time (days or weeks). The soluble polyelectrolyte components then dissolve in sufficiently large amounts so that the polar nature of the film is diminished and it loses its effectiveness. It is only by an appreciable crosslinking of the film in a manner that effects and maintains a desirable range of porosities and water contents that the improved membranes described by this invention are prepared. As is evident from the examples given, the general course of action of the crosslinking agent is not predictable and can vary with the nature of this agent and that of the other components of the casting solution. The use of the higher degrees of crosslinking, as taught by this invention, allows one to incorporate relatively high degrees of polyelectrolyte in the formulation making for membranes of higher permeability, high selectivity and lower resistance—all important characteristics for these membrane systems. Indeed, with the use of relatively high amounts of crosslinking agents, one can employ an excess of polyelectrolyte over that of the film-forming matrix polymer. This formulation is not possible if one uses formulations containing none, or but a small amount, of crosslinking agent for these films swell to the point of partial dissolution and ineffectiveness when placed in water.

The use of formulations containing appreciable amounts of crosslinking agents to produce advantageous membranes is unexpected because the addition of more crosslinking agent to one of the prior formulations leads to a precipitation of part of the components of the casting solution and a loss of homogeneity making the formed films useless. I have found that the addition of certain crosslinking agents in small amounts makes for partial inhomogeneity, but that larger amounts of this agent, when used with the appropriate combination of polymers and solvent (or solvents), act to stabilize the homogeneous solution and make its components more compatible. Improved membranes are the result.

Any of a broad range of crosslinking agents known to those skilled in the art and which are compatible in the casting solution and which may be activated with or without activating agents at the proper stage of porosity, by use of or with appropriate substrates, during the drying of the cast film may be used. Such crosslinking agents may be used singly or in a combination of two or more. As such, any of various epoxides, amines or aldehydes, or complexes thereof having the requisite characteristics, for example, may be used, e.g., epichlorohydrin, boron trifluoridemonoethanolamine complex, epoxide-novolac, polyvinylmethylethermaleic anhydride. the epoxide of bisphenol A, butadiene diepoxide, polystyrene maleic anhydride, formaldehyde, phenol formaldehyde prepolymers, and the like The film-forming matrix polymer and the polyelectrolyte generally will be of a nature such that it may be necessary or preferable to employ a cosolvent system to uniformly dissolve both of the ingredients. However, in some instances, it has been found that a single solvent is all that is necessary to form suitable cation membranes. The solvent system must be such that films are producible therefrom and should dissolve substantially all of the matrix polymer, the polyelectrolyte and the crosslinking agent.

Solvents for the preferred vinyl chloride-acylonitrile film-forming polymers that have given satisfactory results in the invention are acetone, nitromethane, nitroethane, dimethylformamide, cyclopentanone and cyclohexanone. In addition to these solvents, dimethylacetamide, N,N-dimethylacetamide and N,N,N',N'-tetramethoxyamide may be used. Suitable solvents specific to the polyelectrode may be drawn from a wide variety of materials, the best results being obtained by using a low molecular weight aliphatic alcohol having not more than six carbon atoms. A cosolvent system is provided by combining a solvent for the film-forming material with one for the polyelectrolyte.

In the cosolvent systems, excellent results have been obtained by using ratios of cyclohexanone and isopropyl alcohol or methyl alcohol. Thus, for example, membranes were produced very successfully where this system was employed with the plastic film-forming material Dynel, formed by the polymerization of vinyl chloride and acylonitrile, and polystyrene sulfonic acid.

In some cases, such as with dimethylformamide, it is not necessary to use an additional solvent for the polyelectrolyte. However, the two-solvent system is preferred due to the fact that the films thus formed generally have greater mechanical strength than those produced from a single-solvent system.

In forming the solutions of the plastic film-forming material and the polyelectrolyte, care is taken in proportioning the solvents as they will generally be mutually exclusive in their polar and nonpolar characteristics. In the case of polystyrene sulfonic acid, the highly polar nature of the material tends to make it extremely soluble in such polar solvents as water and methyl alcohol. Upon the addition of nonpolar solvents, the polystyrene sulfonic acid is sometimes coagulated from the solution, thus making it difficult to cast a film containing this material. The correct proportions are determined by simple experimentation.

After the plastic film-forming material, the crosslinking agent and the polyelectrolyte have been suitable dissolved in a given solvent or solvent system, they are then formed by any suitable mechanical means into thin films. The formation of the membranes of the present invention is based upon the evaporation of the solvent leaving a film cast upon a suitable surface or mold. The solutions may be passed through a long slot onto a rotating drum whereby a film forms on the drum and is dried. The film is subsequently peeled off. The material may be poured on a continuous moving belt that has provision for controlled heat which will allow the film to dry.

The porosity of these membranes, as reflected by their water content and abilities to reject salts (fine pores), dyes (medium pores) and proteins (large pores) is controlled, in large part, by three factors: the percent crosslinking agent present; the ratio of polyelectrolyte to matrix polymer; the method of drying and cure. The role of crosslinking agent has been detailed earlier, but it is not effective in its action unless the crosslinking reaction takes place when most of the casting solvent has been evaporated and the film is fairly dry. At this point the crosslinking reaction insolubilizes the whole and makes for a fine-pore structure when a sufficient amount of this agent is present. However, if the same film were crosslinked while still swollen with casting solvent where large pores are still present, insolubilization acts to stabilize that open pore structure. Further, crosslinking under these circumstances, when the polymer chains are not in close proximity to one another and properly intertwined, does not act to properly insolubilize the polyelectrolyte and an undesirable loss of this key component occurs.

Films of a medium or large pore structure are prepared by the same general procedures, wherein crosslinking takes place in a film largely free of casting solvent but where less crosslinking agent is used, or more polyelectrolyte is used, both making for an increased porosity and water content.

The fineness of the pore structure or "tightness" of a membrane is indicated also by the concentration potential that is observed. Membranes having high concentration potentials have fine pores; the estimated diameters which are obtained are of the order of 10–12 Angstrom units. Films having lower concentration potentials have an increased porosity, a lower concentration of fixed-charge groups in the sorbed water, and a lowered salt rejection.

While there are no absolutes or standard tests which can be used to define the average pore diameter of fine-pore membranes, it may be estimated that those membranes showing salt rejections in the range of 30% or greater have pore diameters of about 10–12 Angstrom units, or less; those that show dye rejections, as defined herein, in the range from 30% or greater have pores of about 13–16 Angstrom units, or less; and those that show protein rejections, as defined herein, of greater than 97%, have pores of diameter of about 35 Angstrom units or less.

The following examples are provided to more fully illustrate the invention. It will be understood that, because the examples are illustrative, they are not to be construed as limiting the invention, except as defined by the appended claims. All parts are parts by weight, except where otherwise expressly stated.

The following general procedure was employed in casting from nonaqueous solvents, all materials were dry as could be obtained by drying at 40°C over $P_2O_5$ reasonably constant weight; polymer solutions were filtered prior to use. Films were cast on clean surfaces such as glass, glass coated with a dilute carboxymethyl cellulose solution and dried prior to use, stainless steel belts, thin plastic sheets attached to a glass surface, on paper substrates or on hollow fibers or tubes by drawing them through the casting solution. Other surfaces may also be used. The casting technique usually employs a knife blade, although the membranes may be prepared by dipping or spray techniques. After thermal or other treatment, the films may be removed from the casting surface by soaking in water, except, of course, when films are bonded to porous supports or to (treated) papers and are intended as an integral part of such composites. Since these formulations employ crosslinking agents prior to casting, appropriate precautions are taken to combine reactive ingredients shortly before the casting procedure itself.

Characterization Procedures. Membranes were characterized by a number of conventional evaluation procedures. These included:

Thickness (L) in microns measured using a thickness gauge with the water-wet membrane;

Water content (W) in % as grams of water per gram of water-wet membrane;

Concentration potential (C.P.) in millivolts (m.v.) for the membrane separating 0.1 M and 0.2 M potassium chloride at 25°C;

Specific conductivity (K) in $ohm^{-1}$ $cm.^{-1}$ measured in 0.1 M potassium at 25°C;

Hydraulic permeability (HP) in cm/sec.atm. was determined in water or a dilute salt solution under the imposition of a pressure of 60–100 psi;

Salt rejection (S.R.) in % was measured using a 0.01 M potassium chloride solution and magnetic stirring above the membrane, measured at 25°C and employing a designated driving pressure (usually 60 or 100 psi) and reported as the concentration of the feed solution minus that of the product, the whole divided by the feed concentration and multiplied by 100.

Dye rejection (D.R.) in % was measured using a 15 ppm solution of methylene blue, a cationic dye of molecular weight 300 with membranes containing fixed cationic groups, or a 15 ppm solution of erythrosin, an anionic dye of MW 879 was used with membranes containing fixed anionic groups, both measurements being made under the general conditions employed for salt rejection and reported in the same manner;

Protein rejection (P.R.) in % was measured using a 60 ppm solution of bovine serum albumin in a pH 7.4 phosphate buffer employing the general conditions of other rejection measurements.

In addition to casting membranes by drying them on a suitable surface, they may also be prepared by drying on a rotating drum. This latter procedure is substantially as follows: The membranes were cast on a highly polished chromium-plated drum. This drum was rotated on its axis in a horizontal position with an adjustable speed motor and gear assembly. A 250-watt infrared bulb is placed above the drum so that the temperature of the drum could be maintained at the desired value. When the temperature of the drum attains equilibrium, a pan of casting solution is placed under the drum so it extend into the solution approximately one-half inch. The drum is rotated in this casting solution of a period of time, and the pan is removed. Rotation is continued until the membrane dries and is removed by rotating in a pan of deionized water. Multi-layer films may be cast on the rotating cylinder by allowing the previously cast film to set before applying another coating.

In addition to casting the films by the techniques shown, several other methods may also be used with equal effectiveness. The films may be formed by building up several thin films by known multiple casting techniques whereby films of varying thicknesses may be prepared.

A feature of the present invention is that the casting solutions may be sprayed upon porous surfaces which act as bases, supports or frameworks to strengthen the films and make them more adaptable for use in electromechanical apparatus. In this particular adaptation, extremely thin films may be placed on rigid, porous backing members either by spraying or casting technique using dilute solutions. The porous backing members may be of any suitable material usually nonconductive, plastic screens; porous ceramic materials; insulated metal screens, and the like are suitable.

The evaporation of the solvent from the casting solution may be accomplished at room temperature or the temperature may be above room temperature, but in no event should the heat applied exceed the decomposition point of the ingredients of the membrane.

The thickness of these films may readily be controlled by the amount of plastic film-forming material and polyelectrolyte content contained in the solvent or solvent system used to prepare the casting media or by controlling the thickness of the film cast.

As the drying progresses, the amount of solvent contained in the plastic film-forming material tends to be driven from the pores, and a mechanical tightening or contraction of the film surface tends to take place. At the end of a longer period, e.g., a 3-hour period, the pore areas become relatively fixed and more contracted than in the case of a shorter period of drying, e.g., 0.5 hour. Other conditions of time and temperature give corresponding results. At this stage, i.e., when the drying is advanced substantially, the films may be insolubilized by activating the crosslinking agent.

Useful membranes may also be prepared by spinning hollow fibers from the casting solutions described in this invention with suitable modifications of procedures applied in spinning processes such as by employing a higher solids content and/or a higher temperature of spinning. Additionally, membranes can be made by casting these formulations onto a preformed hollow fiber or tube of suitable dimensions such as by drawing the tube through the solution followed by drying and crosslinking of the solution.

EXAMPLE 1

A membrane was prepared by dissolvent 6.9 parts of Kynar with 2..8 parts of PSSA acid of molecular weight 70,000 and 0.3 part of crosslinking agent A, consisting of a solution made up to 1 part $BF_3$-MEA (a complex of boron trifluoride and monoethanolamine available from Harshaw Chemical Company) and 5 parts of DEN-438 (epoxide-novolac resin available from Dow Chemical Company), all of these being dissolved in 90 parts of a mixture of 9 parts hexamethylphosphorictriamide (HMP) available from Dow Chemical Company and 1 part of dimethylformamide (DMF). All substances and solvents were dry. To prevent premature crosslinking, the matrix (Kynar) and polyelectrolyte were dissolved together and filtered to remove dust particles and then combined with the crosslinking agent in solution shortly before membrane casting. Membranes were cast on a clean glass surface with a Gardner knife set at a suitable gate. In this run the knife was set so that the cast film had a wet thickness of about half of that, or 150 microns, and being 10% in solids, dried to a final thickness of 15 microns. The freshly cast films were dried for 1 hour at 100°C and then cured for 3 hours at 150°C. They were then allowed to cool, immersed in water to separate them from the glass surface, washed with water, and then tested. The data and properties of this membrane are presented in the table hereinbelow.

EXAMPLE 2

The procedure of Example 1 was followed, except that 6.1 parts of Kynar, 2.4 parts of PSSA and 1.5 parts of crosslinking agent A were used. Properties of this membrane are set forth in the table.

EXAMPLE 3

A membrane is prepared following the procedure of Example 1, except that 4.7 parts of Kynar, 4.7 parts of PSSA and 0.6 parts of crosslinking agent A were used. Properties are set forth in the table.

EXAMPLE 4

The procedure of Example 1 was followed, except that 4.5 parts of Kynar, 4.5 parts of PSSA and 1.0 part of crosslinking agent A were used. The properties of this membrane are set forth in the table.

EXAMPLE 5

The procedure of Example 1 is followed, except that 3.2 parts of Kynar, 6.4 parts of PSSA and 0.4 part of crosslinking agent A were used. The property data for this membrane is presented in the table.

EXAMPLE 6

The preparation of membrane 6 followed the procedure of Example 1, except that 3.1 parts of Kynar, 6.2 parts of PSSA and 0.7 part of crosslinking agent A were used. The data for this membrane is presented in the table.

EXAMPLE 7

The procedure of Example 1 is followed, except that 2.7 parts of Kynar, 5.4 parts of PSSA and 1.9 parts of crosslinking agent were used. The data for this membrane is set forth in the table.

EXAMPLE 8

The procedure for the preparation of the membrane of Example 1 is followed, except that 2.1 parts of Kynar, 6.9 parts of PSSA and 1.0 part of crosslinking agent A were used. The relevant data are presented in the table.

EXAMPLE 9

The procedure of Example 1 is followed, except that 1.6 parts of Kynar, 6.6 parts of PSSA and 1.8 parts of crosslinking agent A were used. The data for the resulting membrane are set forth in the table.

EXAMPLE 10

The general procedure of Example 1 is followed, except that 4.7 parts of a polyvinyl chloride-acrylonitrile copolymer (Dynel NYGL) available from Union Carbide Corporation is employed as the matrix polymer, 4.7 parts of PSSA and 0.6 part of crosslinking agent A were used, all being dissolved in 90 parts of DMF. The properties of this membrane are presented in the table.

EXAMPLE 11

The general procedure of Example 1 is followed, except that 4.6 parts of Kynar, 4.6 parts of PSSA and 0.8 part of crosslinking agent B, consisting of a solution made up of 1 part $BF_3$-MEA and 40 parts bisphenol-A epoxide (available as ERL-2774 from Union Carbide Corporation) were used, all being dissolved in 90 parts of dimethyl sulfoxide (DMSO). The pertinent properties are presented in the table.

EXAMPLE 12

The general procedure of Example 1 is followed, except that 2.8 parts of Dynel NYGL, 2.8 parts of PSSA and 4.4 parts of crosslinking agent A were used, all being dissolved in 90 parts of DMF. The properties of the membrane are presented in the table.

EXAMPLE 13

The general procedure of Example 1 is followed, except that 4.5 parts of Kynar, 4.5 parts of polyvinylmethylimidazolium iodide (QPVIMI), molecular weight about 125,000 (the base polymer, not quaternized, available from Badische Anilin and Soda Fabrik, quaternization carried out with methyl iodide), and 1.0 part of crosslinking agent A were used, all being dissolved in 90 parts of DMF. After drying for 1 hour at 100°C, the films were cured at 125°C for 5 hours. The data for this membrane are presented in the table.

EXAMPLE 14

The procedure of Example 13 is followed, except that 3.0 parts of Kynar, 6.0 parts of QPVIMI and 1.0 part of crosslinking agent A were used. The data for this membrane are found in the table.

EXAMPLE 15

The procedure of Example 13 is repeated, except that 1.5 parts of Kynar, 7.3 parts of QPVIMI and 1.2 parts of crosslinking agent A were used. The properties for this membrane are presented in the table.

EXAMPLE 16

The procedure of Example 13 is repeated, except that 7.6 parts of Kynar, 1.5 parts of QPVIMI and 0.9 part of crosslinking agent A were used. The data for the resulting membrane are set forth in the table.

EXAMPLE 17

The general procedure of Example 1 is repeated, except that 2.8 parts of polyvinyl alcohol (PVA) available as Gelvatol 1-90 from Monsanto Chemical Company having a medium molecular weight, 5.5 parts of polystyrene sodium sulfonate (PSSNa) having a molecular weight 300,000–600,000 and available from Dow Chemical Company, and 1.7 parts of polyvinylmethyl ether-maleic anhydride (PVM/MA) having a molecular weight of about 250,000 and supplied as the anhydride by General Aniline and Film under the name of Gantrez AN-119, were dissolved in 90 parts water, then case in the usual manner. These films were dried at 60°C for 0.5 hour when the final dry product was 50 microns or less in thickness; alternately they may be dried for 24 hr. at 60°C when they were thicker. Following drying, the membranes were cured at 140°C for 3 hours. Data for these membranes are presented in the table.

EXAMPLE 18

The procedure of Example 17 is followed, except that 5.8 parts of PVA, 3.0 parts of PSSNa and 1.2 parts of PVM/MA having a molecular weight of about 250,000 were used. Data are presented in the table.

EXAMPLE 19

The procedure of Example 17 is followed, except that 5.0 parts of PVA, 2.5 parts of PSSNa and 2.5 parts of PVM/MA were used. The data for this membrane are presented in the table.

EXAMPLE 20

The procedure of Example 17 was essentially repeated, except that 6.1 parts of PVA, 3.1 parts of PSSNa and 0.8 part of PVM/MA were used. The data for this membrane are set forth in the table.

EXAMPLE 21

The procedure of Example 20 is essentially repeated, except that a thinner film was cast sufficient to provide upon curing a film having a thickness of 8 microns. Data for this membrane are presented in the table.

EXAMPLE 22

The procedure of Example 17 is repeated, except that 1.9 parts of PVA, 7.6 parts of PSSNa and 0.5 part of PVM/MA were used. The data for this membrane are set forth in the table.

EXAMPLE 23

The procedure of Example 17 is repeated, except that 4.7 parts of PVA, 2.0 parts of PSSNa and 3.3 parts of PVM/MA were used. The properties for this membrane are presented in the table.

EXAMPLE 24

The procedure of Example 17 is repeated, except that 7.1 parts of PVA, 2.2 parts of PSSNa and 0.7 part of trimethylol propane (TMP) available from Celanese Corporation were used, and the cast film dried at 65°C for 4 hours prior to cure at 140°C for 0.5 hour. The data for this membrane are set forth in the table.

EXAMPLE 25

The procedure of Example 24 is repeated, except that 3.7 parts of PVA, 1.0 part of PSSNa and 5.2 parts of TMP were used. The properties of this membrane are set forth in the table.

EXAMPLE 26

The general procedure of Example 1 is followed, except that 4.3 parts of PSSA and 5.7 parts of a soluble phenol-formaldehyde condensate (available as BRL-1100 from Union Carbide Corp. and functioning as matrix and crosslinking agent) were used, these two components being dissolved in 60 parts of DMF. The data for this membrane are presented in the table.

EXAMPLE 27

The procedure of Example 26 is followed, except that 5.6 parts of PSSA and 4.4 parts of BRL-1100 were used. The data for the membrane produced according to this example are set forth in the table.

EXAPLE 28

The general procedure of Example 1 is followed, except that 4.2 parts of polyvinyl butyral (PVB) (available from Union Carbide Corporation as XYHL), 5.0 parts of polyvinyl sulfonic acid (PVSA) which was prepared from the sodium salt (obtained from Farbwerke Hoechst) by saturating in an HCl solution and removing the salt precipiate, and 0.8 part of 37% aqueous formaldehyde were used, the three components being dissolved in 50 parts DMSO, the cast film being dried 1 hr. at 100°C and then cured for 2 hr. at 125°C. The properties of this membrane are set forth in the table.

EXAMPLE 29

The procedure employed in Example 28 is repeated, except that 3.6 parts of PVB, 5.5 parts of PVSA and 1.9 parts of TMP were used, these components being dissolved in 50 parts of cellosolve. The data for the membrane prepared by this example are set forth in the table.

EXAMPLE 30

The general procedure of Example 17 was followed, except that 3.8 parts of PVA, 5.7 parts of PVSA and 0.5 part of TMP were used, and dissolved in 45 parts of water. The membrane data are presented in the table.

EXAMPLE 31

The general procedure of Example 17 is followed, except that 2.9 parts of PVA, 5.0 parts of PSSNa and 2.1 parts of a 50% aqueous solution of glutaraldehyde were dissolved in 90 parts of water. The data for this membrane are presented in the table.

in the molar ratio of 1:2, combined with 1 part of PVB polymer which contains 10% alcohol group, in 10 parts of DMF. The film is cast and cured according to the procedures described in Example 1.

EXAMPLE 34

Another example of the same class, i.e., wherein the same polymer functions as polyelectrolyte and cross-linking agent, is prepared by forming a castable solution consisting of 1 part of a linear condensate of phenolsulfonic acid, phenol and formaldehyde and 1 part of Kynar in 10 parts of DMF. This composition is cast and cured according to the procedure of Example 1.

EXAMPLE 35

PROPERTIES OF MEMBRANES EXAMPLES 1–31

| Example | L ($\mu$) | W (%) | C.P. (mv) | $K \times 10^3$ (ohm$^{-1}$ cm$^{-1}$) | $HP \times 10^5$ (cm/sec atm) | S.R.$^{(a)}$ (%) | D.R.$^{(a)}$ (%) | P.R.$^{(a)}$ (%) |
|---|---|---|---|---|---|---|---|---|
| 1 | 15 | 16 | 9.5 | 0.8 | 5.0 | 57 | 92 | 100 |
| 2 | 18 | 10 | 16.0 | 1.0 | 0.06 | 70 | 99 | 100 |
| 3 | 15 | 33 | 6.7 | 5.0 | 18.0 | 44 | 86 | 100 |
| 4$^{(b)}$ | 26 | 28 | 9.1 | 8.0 | 7.0 | 55 | 97 | 100 |
| 5 | 20 | 43 | 3.0 | 6.0 | 84.0 | 10 | 25 | 100 |
| 6$^{(b)}$ | 28 | 46 | 5.0 | 9.0 | 39.0 | 42 | 89 | 100 |
| 7 | 25 | 59 | 7.9 | 12.0 | 18.0 | 59 | 99 | 100 |
| 8 | 15 | 67 | 3.0 | 17.0 | 88.0 | 55 | 90 | 100 |
| 9 | 15 | 83 | 2.0 | 23.0 | 94.0 | 50 | 85 | 100 |
| 10 | 20 | 58 | 14.1 | 3.0 | 20.0 | 46 | 90 | 100 |
| 11 | 50 | 45 | 13.2 | 5.0 | 12.0 | 35 | 85 | 100 |
| 12 | 65 | 27 | 15.6 | 5.0 | 5.0 | 67 | 98 | 100 |
| 13$^{(c)}$ | 20 | 30 | 15.1 | 1.0 | 0.2 | 64 | 99 | 100 |
| 14 | 23 | 59 | 13.0 | 6.0 | 1.0 | 54 | 99 | 100 |
| 15 | 23 | 73 | 10.3 | 8.0 | 3.0 | 48 | 94 | 100 |
| 16 | 17 | 6 | 10.5 | 0.01 | 0.06 | 85 | 100 | 100 |
| 17 | 2 | 70 | 4.0 | 9.0 | 19.0 | 30 | 82 | 100 |
| 18 | 4 | 72 | 3.1 | 4.0 | 13.0 | 30 | 70 | 100 |
| 19 | 11 | 45 | 8.4 | 2.0 | 1.0 | 55 | 97 | 100 |
| 20 | 81 | 70 | 3.7 | 12.0 | 6.0 | 9 | 46 | 94 |
| 21 | 8 | 70 | 3.4 | 13.0 | 52.0 | 3 | 32 | 95 |
| 22 | 505 | 90 | 0.7 | 12.0 | 10.0 | 18 | 40 | 95 |
| 23 | 230 | 30 | 16.1 | 5.0 | 0.8 | 50 | 92 | 100 |
| 24 | 26 | 61 | 2.2 | 2.0 | 2.0 | 5 | 17 | 78 |
| 25 | 50 | 69 | 1.8 | 3.0 | 1.0 | 17 | 69 | 94 |
| 26 | 20 | 20 | 12.4 | 0.1 | 3.0 | 60 | 89 | 100 |
| 27 | 20 | 32 | 16.1 | 15.0 | 39.0 | 74 | 100 | 100 |
| 28 | 20 | 34 | 15.5 | 20.0 | 2.0 | 59 | 98 | 100 |
| 29 | 20 | 44 | 15.5 | 20.0 | 4.0 | 60 | 97 | 100 |
| 30 | 20 | 60 | 15.9 | 20.0 | 16.0 | 40 | 88 | 100 |
| 31 | 30 | 71 | 4.5 | 31.0 | 33.0 | 30 | 78 | 100 |

$^{(a)}$All measurements of salt, dye and protein rejections were carried out using driving pressures of 60 psi for membranes of Examples 1–16 and 100 psi for membranes of Examples 17–31.
$^{(b)}$These membranes showed the following rejections of sodium sulfate at these specified concentrations, all measured at 60 psi: 3 M, 0%; 0.5, 8; 0.05, 40; 0.005, 95; 0.0005, 97.
$^{(c)}$This membrane showed the following rejection of calcium chloride at these specified concentrations, all measured at 60 psi: 1 M, 0%; 0.1, 20; 0.01, 67; 0.001, 93; 0.0003, 98.

EXAMPLE 32

A bipolar membrane is prepared by first casting a film, in accordance with the procedure used in Example 13, allowing the cast film to dry and substantially cure and then casting on top of the foregoing membrane a second film of the formulation of Example 6 allowing the latter film to dry and the entire composite to substantially completely cure. The bipolar membrane so formed exhibited a salt rejection of 90% at 60 psi driving pressure and a rejection to 0.01 M sodium sulfate or calcium chloride of 95%, measured also at 60 psi driving pressure.

EXAMPLE 33

A formulation is prepared according to the general procedure wherein the fixed-charge groups and cross-linking groups are part of the same molecule, i.e., by preparing a membrane solution consisting of 1 part of copolymer of maleic anhydride and vinylsulfonic acid A hollow membrane is prepared by drawing a porous hollow fiber having an outside diameter of 50 microns and an inside diameter of 30 microns of based hydrolyzed cellulose acetate through a casting solution of the kind described in Example 1 and thereafter dried and cured as recited therein.

EXAMPLE 36

The hollow fiber of Example 35 was drawn through a solution of the membrane composition of Example 26 and thereafter dried and cured as recited in Example 1.

A comparison of the properties of membranes 13, 14 and 15 demonstrates the variability in the properties of the membranes that can be produced by the procedures of this invention. All these films contain the same materials in different proportions, and all have about the same amount, i.e., 10–12%, of crosslinking agent.

Membrane 13 contains 45% polyelectrolyte; membrane 14 contains 60% and membrane 15 contains 73%. Their water contents are in the sequence 30, 59 and 73% illustrating how a higher ratio of polar polyelectrolyte increases water contents. Their C.P. values are in the sequence 15.1, 13.0 and 10.3, and their S.R. values in the same sequence are 64%, 54% and 48%. At the same time, their D.R. values remain higher because their pores are still too small to admit the relatively large dye molecules. Their H.P. values are in the sequence 0.2, 1 and 3 because, as porosity and total pore volume increase, so does hydraulic permeability.

All of the foregoing illustrates the wide range of variability and range of useful properties that can be attained by an application of the teachings of this invention. In the treatment of process streams and in control of pollution, one usually wishes to reject one class of solutes while allowing others to pass through. The teaching provided herein allows one to talor-make a membrane to fit a specific application using only a single formulation or a limited set of formulations.

The membranes of the invention have a varied field of utility. For example, they are useful in removing dyes or solid particles such as salt or proteins from liquid dispersions. Other applications include concentrating dilute salt solutions, e.g., radioactive waste waters; separating ionic mixtures as in the production of splitting of waste, neutral salts such as sodium sulfate; preparation of organic acids from their salts and subsequent purification of the acid; preparation of amines from their hydrochloride salts and their subsequent purification; electrolytic processes where the cathode and anode products must be kept separated, i.e., battery separators; recovering sulfuric acid and iron from spent sulfuric acid pickle liquors, and recovery of hydrochloric acid from spent hydrochloric acid pickle liquors; separation of electrolytes from nonelectrolytes in aqueous systems as in producing silica sols, removing ionic impurities from glycerine, artificial body organs, isolating specific enzymes, and separation of nonelectrolytes from electrolytes by diffusion of the former through the membrane (continuous ion exclusion); removing electrolytes from nonelectrolytes in nonaqueous systems as in removing ionic impurities from gasoline, and removing ionic impurities from oil; physical and biological research investigations as in the determination of the dissociation constant of polyphosphates, and studying the structure of proteins; and ion interchange by diffusion across membranes as in softening by replacing calcium and magnesium with sodium countercurrent flow conditions, and salt splitting by exchanging hydrogen ions across a cation membrane or hydroxyl ions across an anion membrane under countercurrent flow conditions.

It will be apparent that other variations may be made by one skilled in the art without departing from the invention claimed.

What is claimed is:

1. A chemically cross-linked non-fouling polymeric membrane including polyelectrolytes having fixed-charge groups and characterized by a hydraulic permeability of $10^{-3}$ to $10^{-7}$ cm/sec. atm. measured in water or dilute salt solution under a pressure of 60 to 100 psi, a water content of from about 15 to about 75%, and characterized by a uniform porosity which produces a salt rejection of from 1.0 to 85% measured using 0.01 M potassium chloride solution at 25°C and 60 to 100 psi.

2. The polymeric membrane of claim 1, wherein the fixed-charge groups are supplied by a polyelectrolyte containing sulfonic acid radicals.

3. The polymeric membrane of claim 1, wherein the fixed-charge groups are supplied by a polyelectrolyte containing quaternary ammonium radicals.

* * * * *